United States Patent
Yariv et al.

(10) Patent No.: US 8,388,427 B2
(45) Date of Patent: Mar. 5, 2013

(54) PROMOTING EXPLORATION

(75) Inventors: Eran Yariv, Zichron (IL); Hen Fitoussi, Tel Aviv (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/162,551

(22) Filed: Jun. 16, 2011

(65) Prior Publication Data

US 2012/0323347 A1    Dec. 20, 2012

(51) Int. Cl.
*A63F 9/24* (2006.01)
(52) U.S. Cl. .................................. 463/9; 705/7
(58) Field of Classification Search .............. 463/31–42, 463/9; 705/7
See application file for complete search history.

(56) References Cited

U.S. PATENT DOCUMENTS

| | | | |
|---|---|---|---|
| 5,410,485 A * | 4/1995 | Ichikawa | ...................... 701/428 |
| 6,615,133 B2 | 9/2003 | Boies et al. | |
| 6,885,874 B2 | 4/2005 | Grube et al. | |
| 2005/0222756 A1 | 10/2005 | Davis et al. | |
| 2006/0287030 A1 * | 12/2006 | Briggs et al. | ...................... 463/9 |
| 2007/0005233 A1 | 1/2007 | Pinkus et al. | |
| 2008/0091341 A1 | 4/2008 | Panabaker et al. | |
| 2009/0005018 A1 | 1/2009 | Forstall et al. | |
| 2009/0201149 A1 * | 8/2009 | Kaji | ......................... 340/539.13 |
| 2009/0210302 A1 | 8/2009 | Tashev et al. | |
| 2010/0287011 A1 * | 11/2010 | Muchkaev | ......................... 705/7 |
| 2010/0332310 A1 * | 12/2010 | Russell et al. | ............. 705/14.36 |
| 2011/0212717 A1 * | 9/2011 | Rhoads et al. | ................. 455/420 |

OTHER PUBLICATIONS

"Collaborative Bike Routes", Retrieved at <<http://thumbshift.wordpress.com/2010/03/16/adaptive-routes/>>, Retrieved Date: Dec. 24, 2010, 7 pages.

* cited by examiner

*Primary Examiner* — Masud Ahmed

(57) ABSTRACT

Exploration outside of a person's normal area may be detected and rewarded. In one example, a game (or other type of application) may be built around such exploration. A device carried by a user (pursuant to appropriate permission obtained from the user) may report the user's location to a presence detector. The presence detector may use this information to build a heat map, indicating the user's areas of common presence. When the location information received from the device indicates that the user has ventured outside of the user's area of common presence, this exploration event may be rewarded with an increase in the user's score. The user's score may be published on social media.

17 Claims, 5 Drawing Sheets

PROMOTING EXPLORATION

BACKGROUND

Increasingly, people are carrying devices that have the ability to pinpoint their location. While people generally have the ability to opt-out of location tracking in the interest of preserving their privacy, many people choose to use location tracking features of their phones and other devices because of the variety of services that can be provided using location information. For example, knowing a device's location can assist in getting driving or walking directions, performing a localized search, or various other tasks.

Because of the availability of location information, various services have developed to leverage the information in both social and business contexts. For example, Foursquare is a location-based social networking site that rewards people for visiting certain places in the real world. A business may seek to become a Foursquare venue, because doing so tends to encourage real-world traffic at the business. However, Foursquare tends to encourage traveling to venues in specific types of towns, such as cities, dense suburbs, or up-and-coming small towns.

SUMMARY

An exploration game (or other type of competition) may reward users for traveling "off the beaten path". A system that implements the competition may track a user's physical location. (In order to respect a user's privacy, the user may be able to opt-out of having his or her location tracked.) Based on the locations in which the user has been observed, a heat map may be created indicating where the user is particularly likely, or particularly unlikely, to appear. A scoring system may be created that rewards the user for traveling to areas in which the user does not frequently appear. For example, if the user often travels between Seattle, Wash. and Redmond, Wash., the user would receive few or no points for being in either area. On the other hand, if the user travels to an area to which the user does not frequently travel—such as Tacoma—the user could be rewarded with points. If the user travels to Australia, the user might receive even more points, since Australia may be an area to which the user does not frequently travel and which is particularly distant from the Seattle-Redmond area that the user is regularly found in.

The user's score may be publicized through various channels. For example, the user's score may be published through social-networking sites (e.g., Facebook), microbloging media (e.g., Twitter), or through any other mechanism. Similarly, the particular places to which the user has traveled may be publicized (e.g., if the user travels to Australia, the system might automatically tweet "Joe is in Australia" on behalf of the user). Moreover, a "leader board" of particularly high-scoring users may be published.

Scores may be dynamic in the sense that they can both increase and decrease over time. For example, a user who visits a particularly distant or exotic place might receive a large increase in score. However, if, say, six months then pass without the user's traveling away from his normal haunts, then the user's score may degrade over time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
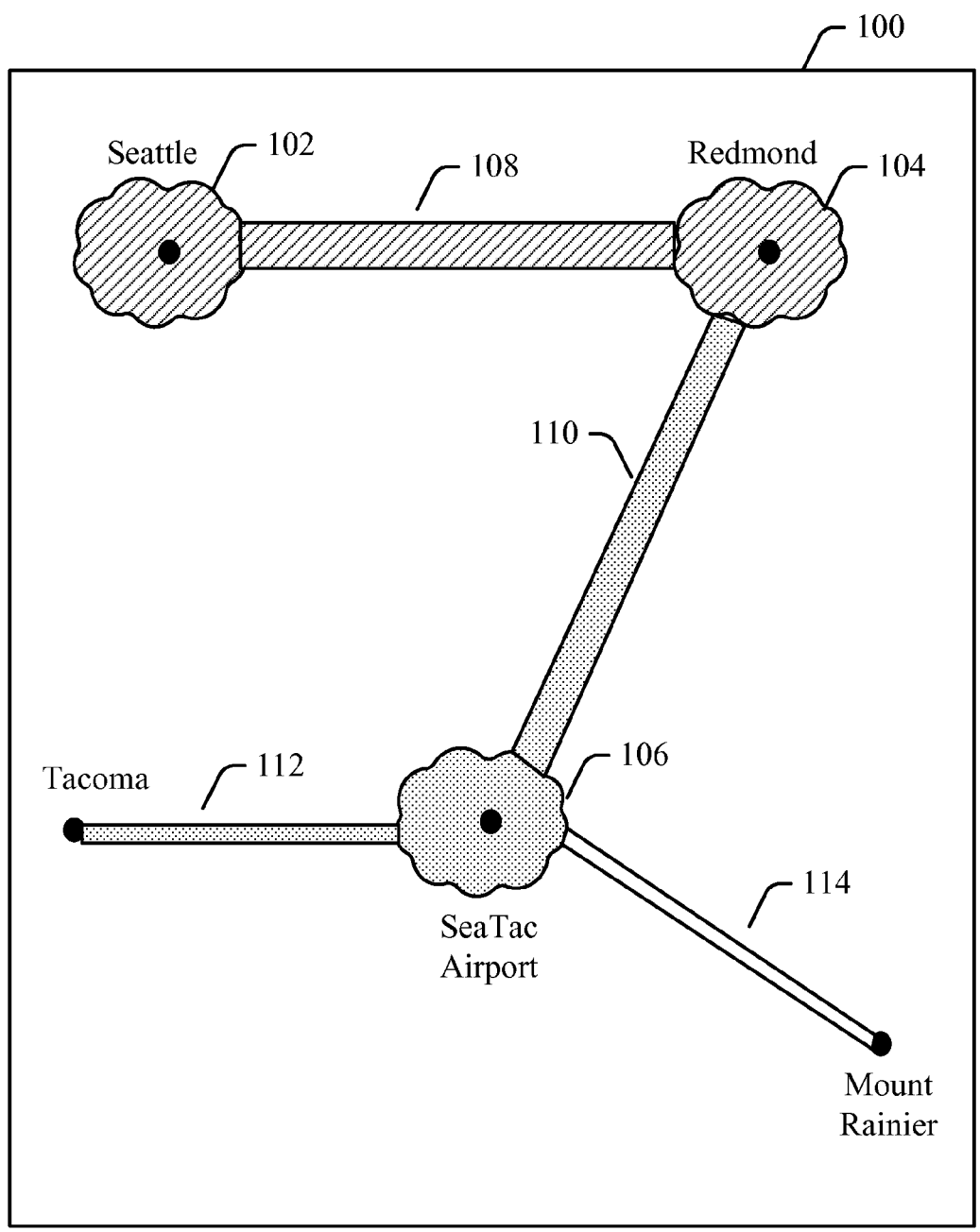
FIG. 1 is a block diagram of a geographic area in which a person may travel.

It has become common for people to carry devices that have the capability to sense their location. Although some people choose to turn off this capability in the interest of preserving privacy, many device users choose to have their devices determine their location and may have their devices report that information to an online service. A device's ability to determine a user's location allows the device to offer the user various types of service that cannot otherwise be obtained easily. For example, a device can be used to perform a local search centered around the user's present location, or can provide driving or walking directions from "here" (rather than the user having to enter both the starting and ending points). Some services, such as Foursquare, provide models of social interaction that are explicitly driven by the user's location: In Foursquare, the user "checks in" at "venues", and earns badges based on the venues that he or she has visited.

While services such as Foursquare reward the user for certain types of travel or movement, these services tend to focus on venues in densely-populated areas or up-and-coming rural areas. It is fun for the user to check in at venues and earn rewards based on how many different venues he has visited. In a sense, treating a user's history of visiting places as a game (or other type of application) feeds people interest in demonstrating their experience and worldliness. However, there are other types of behaviors that might feed the same instinct, and that systems such as Foursquare do not encourage. In particular, systems like Foursquare may encourage travel to Foursquare check-in sites, but do not specifically encourage travel outside of those areas in which the user is normally found.

The subject matter described herein provides a game (or other type of application) in which users earn rewards by traveling outside of the areas in which they are normally found. A participant in the game carries a device (e.g., smart phone, handheld computer, handheld music player), that is capable of determining and reporting the device's location. (As noted above, in order to protect the user's interest in the privacy of his or her location, the device's capability to determine and report its location may be activated pursuant to appropriate permission obtained from the user, and the user may be given the chance to deactivate these capabilities.) Assuming that appropriate permission has been obtained from the user, the device may report its location back to a presence detector that monitors the locations of participating user. The presence detector may create a heat map for each user. The heat map is, in effect, a bivariate distribution function that indicates the user's likelihood of being at any particular set of coordinates on a map. By using the heat map as an indication of where the user is likely to be found, if the user physically travels outside of his or her normal area, the user may be awarded points, thereby increasing the user's exploration score. If the user returns to his or her normal area and remains there for a long time, the user's exploration score may degrade, so that user's who have gone a long time without exploring outside of their normal areas may have lower exploration scores.

In addition to awarding the user points for traveling outside of the user's normal area, additional points may be awarded for travel to places that are particularly distant or exotic. Moreover, while traveling to a distant or exotic place may cause a large increase in score the first time the user makes such a journey, traveling to the same place repeatedly may cause each trip to result in fewer and fewer points.

A user's exploration score may be publicized in various ways. For example, the user may arrange to have his or her score posted automatically to Facebook or Twitter. Additionally, a "leader board" of accomplished (high scoring) explorers may be created and may be posted on web sites and/or published through various channels.

It is noted that the subject matter herein differs from systems that merely direct users away from high traffic areas. Such systems may direct users to places that are less-well-traveled by the population as a whole. However, such systems do not reward a user for traveling outside of that particular user's normal area of presence, because such systems consider only whether a particular area is well-traveled by the population as a whole; they are not aware of where an individual user tends to be located. Moreover, the subject matter herein differs from systems that try to generate traffic for certain locations (e.g., a little-known restaurant on a little-traveled road) by incentivizing users to visit those locations. Such systems would incentive a user to travel to such a location even if the user frequently can be found in that location. (For example, there might be a particular restaurant that is little-known by the general population, but that one particular user visits frequently.) By contract, examples of the subject matter herein reward a user for traveling outside of his normal area.

Moreover, while a game is one example type of application that could reward people for traveling outside of their normal areas, other types of applications could implement the subject matter herein. For example, a business or productivity application could reward people for travel in a competition, or other type of setting, that is not strictly a game (e.g., rewarding traveling salesmen as a way of encouraging them to explore new territory).

Turning now to the drawings, FIG. 1 shows a physical geographic area 100 in which a person may travel. Geographic area 100, in this example, includes various places in Washington State: the city of Seattle, and the region 102 around that city; the city of Redmond, and the region 104 around that city; SeaTac Airport, and the region 106 around that airport; the city of Tacoma; and Mount Rainier. These areas, and the roads 108, 110, 112, and 114 between them, are shown marked with various patterns, indicating different frequencies with which a given person has been observed in those areas. The region 102 around Seattle, the region 104 around Redmond, and the road 108 connecting those regions are marked with a diagonal pattern. For the purpose of FIG. 1, the diagonal pattern indicates that the person has been in those areas with a high frequency. On the other hand, the region 106 around SeaTac Airport, the road 110 connecting Redmond with SeaTac Airport, and the road 112 connecting SeaTac Airport with Tacoma are marked with a dotted pattern. In this example, the dotted pattern indicates that the person has been observed in those areas with relatively low frequency. The road 114 from SeaTac Airport with Mount Rainier has no pattern, indicating that the person has not been observed on that road (or has been observed there only with very low frequency).

FIG. 1 represents a type of heat map. Typically, a heat map is shown in colors that continuously change from one end of the spectrum to the other (with red indicating high frequency, violet indicating low frequency, and colors in between indicating intermediate frequencies). However, the black-and-white drawing in FIG. 1 shows the same concept in a simplified form: for a given geographic area, FIG. 1 shows (using diagonal and dotted patterns) how frequently a person has appeared at different points within that area. To the extent that past behavior is indicative of future behavior, the map, therefore, shows the likelihood (or non-likelihood) that the person will appear at any particular point on the map. As discussed below, this information about where a person has historically been found can be used to reward exploration, by rewarding people for traveling in areas in which they have not frequently been found in the past.

Figure 2:
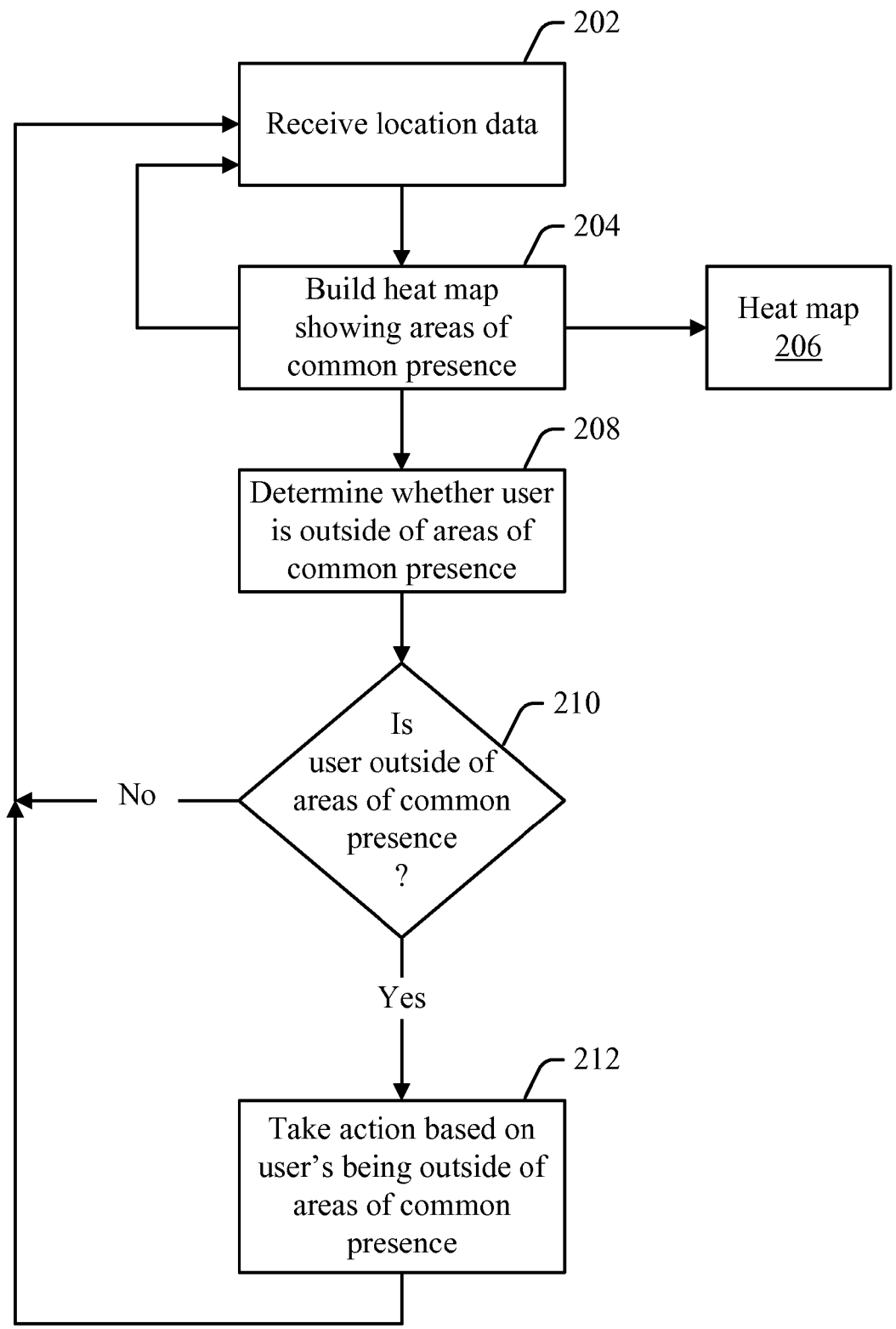
FIG. 2 is a flow diagram of an example process of determining whether a person has explored out of the area in which that person is normally found.

FIG. 2 shows an example process of determining whether a person has explored out of the area in which that person is normally found. Before turning to a description of FIG. 2, it is noted that the flow diagram of FIG. 2 shows an example in which stages of a process are carried out in a particular order, as indicated by the lines connecting the blocks, but the various stages shown in FIG. 2 can be performed in any order, or in any combination or sub-combination.

At 202, location data is received from a user. For example, the user may carry a smart phone with a Global Positioning System (GPS) receiver, and the GPS receiver may provide information concerning the user's location. (In order to preserve the user's interest in privacy, the use of information about the user's location may be obtained pursuant to appropriate permission received from the user.) Thus, information concerning where the user is at various points in time may be received. At 204, the location data may be used to build a heat map 206 showing areas of the user's common presence—i.e., those areas in which the user tends to be found, and at what frequency. For example, the areas in FIG. 1 marked with diagonal and dotted patterns may be interpreted as "areas of common presence" (although, as mentioned above, the person might appear in the diagonal areas more frequently than in the dotted areas). FIG. 1, discussed above, shows a simplified representation of a heat map, although heat map 206 could be represented in any form. For example, heat map 206 could be a table showing those streets on which the user travels and at what frequency, or heat map 206 could be a continuous function that is interpolated from the user's location data and that indicates, for any point in 2-dimensional space, the user's historical likelihood of being at that point. In general, heat map 206 could be represented in any appropriate manner.

Figure 3:
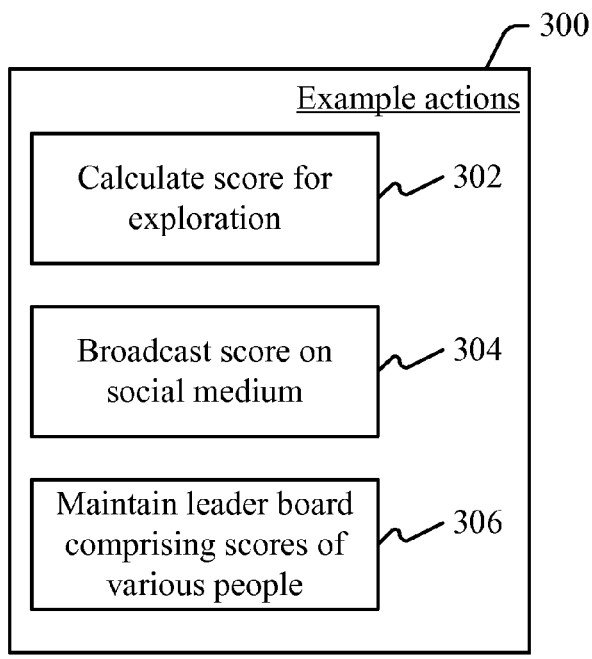
FIG. 3 is a block diagram of some example actions that may be taken when a user is found to have ventured outside of his or her area of common presence.

The process of receiving location data at 202 and building a heat map at 204 may take place continually (as indicated by the arrow looping back from 204 to 202), thereby allowing new information about the user's location to be collected. However, at some point it may be determined (at 208) whether the user has traveled outside of his or her area of common presence. For example, with reference to FIG. 1, if the person travels outside of the areas marked with diagonal or dotted patterns, that person may be considered to have traveled outside of his or her area of common presence. If the user has traveled outside of his or her area of common presence (at 210), then an action may be taken based on the fact that the user has traveled outside of that area (at 212). Examples of actions that may be taken are shown in FIG. 3, and are described below. If the person has not traveled outside of the area of common presence, then the process of FIG. 2 may return to 202, so that the process may continue receiving location data about the user, and may continue determining whether the user has ventured outside of his or her area of common presence based on any new location data that is received. (After an action is taken, the process may also return to 202 in order to continue receiving location data about the user.)

As noted above, there are various actions 300 that may be taken when the user is found to have ventured outside of his or her area of common presence. FIG. 3 is a block diagram of some example actions that may be taken.

One example action (block 302) that may be taken is to calculate a score for exploration. As noted above, one can make a game (or other type of competition) out of exploring outside of one's normal area. Thus, when a user is determined to have ventured outside of his or her normal area, the user may receive some type of points to increase his or her score in such a game. (FIG. 4, described below, shows some example factors that may be used to determine how much to affect the score. However, for the purpose of block 302, it is assumed that the score for exploration could be calculated in any manner.)

Another example action (block 304) that may be taken is to broadcast or publish the score (or the event that resulted in the score) on a social medium, such as Facebook or Twitter. For example, if a user named Joe visits Australia, thereby resulting in an increase in score, a message may be posted on Facebook, or tweeted on Twitter, such as "Joe has 125,900 exploration points", or "Joe visited Australia".

Another example action (block 310) that may be taken is to maintain a "leader board" comparing scores of various high-scoring users. For example, if scores are being maintained as part of an exploration game (or other competition), and if Joe, Bob, and Susan have the highest scores in the game, then a board showing their names and scores may be created. This board may be shown on various web sites. For example, users may install the board as an item to be viewed on their home pages in various social networking sites (such as Facebook or LIVE SPACES), thereby allowing them to keep track of other players of the exploration game. In one example, a user might specify which other users' scores he or she wants to see on the board—e.g., if Joe is friends with Bob and Susan, he might request to see a board showing all of their scores, rather than the scores of other players whom Joe does not know.

Figure 4:
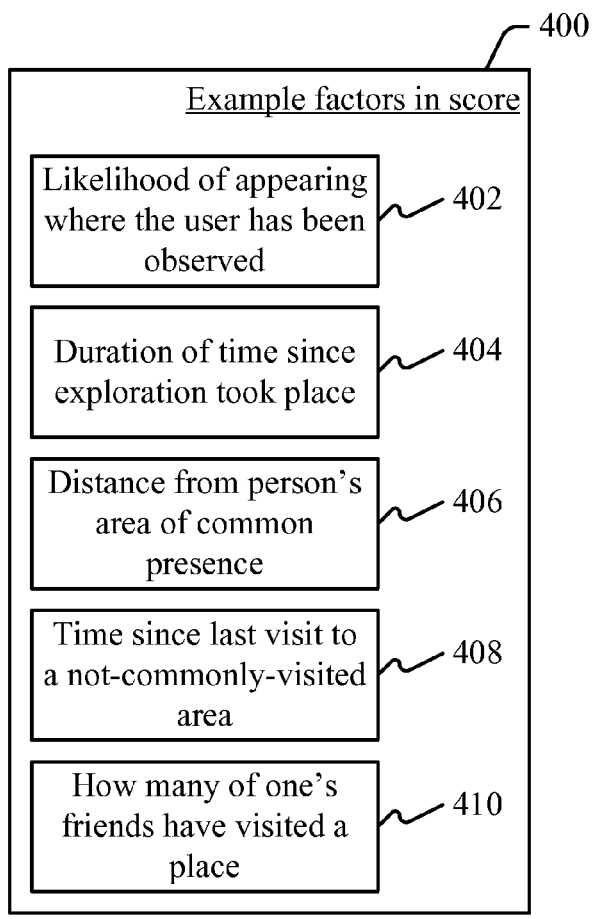
FIG. 4 is a block diagram of some example factors that may affect an exploration score.

As noted above, the amount that a particular exploration event affects a score may be determined based on several factors. FIG. 4 shows some examples of those factors 400.

One example factor (block 402) is the likelihood of the user's appearing where in the location at which the user is presently observed to be. Thus, with reference to FIG. 1, if the user commonly appears in Seattle, Redmond, and the road between those cities, but the user is at some point observed at Mount Rainier, then the user has been found at a place where that user is not frequently observed. For the user to be at Mount Rainier, therefore, constitutes exploration on the user's part, and the user may be rewarded for this exploration with an increase in score.

Another example factor (block 404) is the duration of time since exploration has taken place. For example, when the user visited Mount Rainier, he or she may have received 10,000 points for that exploration. If, however, the user returns home to the Seattle/Redmond area and six months pass without the user's leaving that area, then the user's score may degrade, since the past act of exploration has become stale. For example, the user might lose 1,000 points for every month that the user goes without leaving his or her area of common presence, so six months without exploration would result in a degradation of 6,000 points.

Another example factor (block 406) is the distance from the user's areas of common presence—i.e., how far the user has explored. For example, if the user is frequently found in Seattle and Redmond and then explores to Mount Rainier, the user might receive 10,000 points. However, if the same use travels to Australia, the user might receive 100,000 points, since Australia is considerably further from the Seattle/Redmond area than is Mount Rainier.

Another example factor (block 408) is the amount of time since the user has previously visited a particular not-commonly-visited area. For example, if the user who frequents Seattle/Redmond travels to Australia, he or she might receive 100,000 points for the exploration to Australia. However, if the user then comes home and then goes back to Australia after two weeks, the user might receive fewer than 100,000 points (or even no points), since Australia is not really a new place to explore the second time the user visits. On the other hand, if a longer time passes between the first and second trips to Australia (e.g., one year), then the user might receive the same 100,000 points for both trips.

Another example factor (block 410) is the number of one's friends who have visited a particular place. For example, a system could award extra points for visiting a place that one's friends have visited. In another example, a system could determine that visiting the same places as one's friends is not very adventuresome, and might award fewer points if one visits the same place as one's friends.

Figure 5:
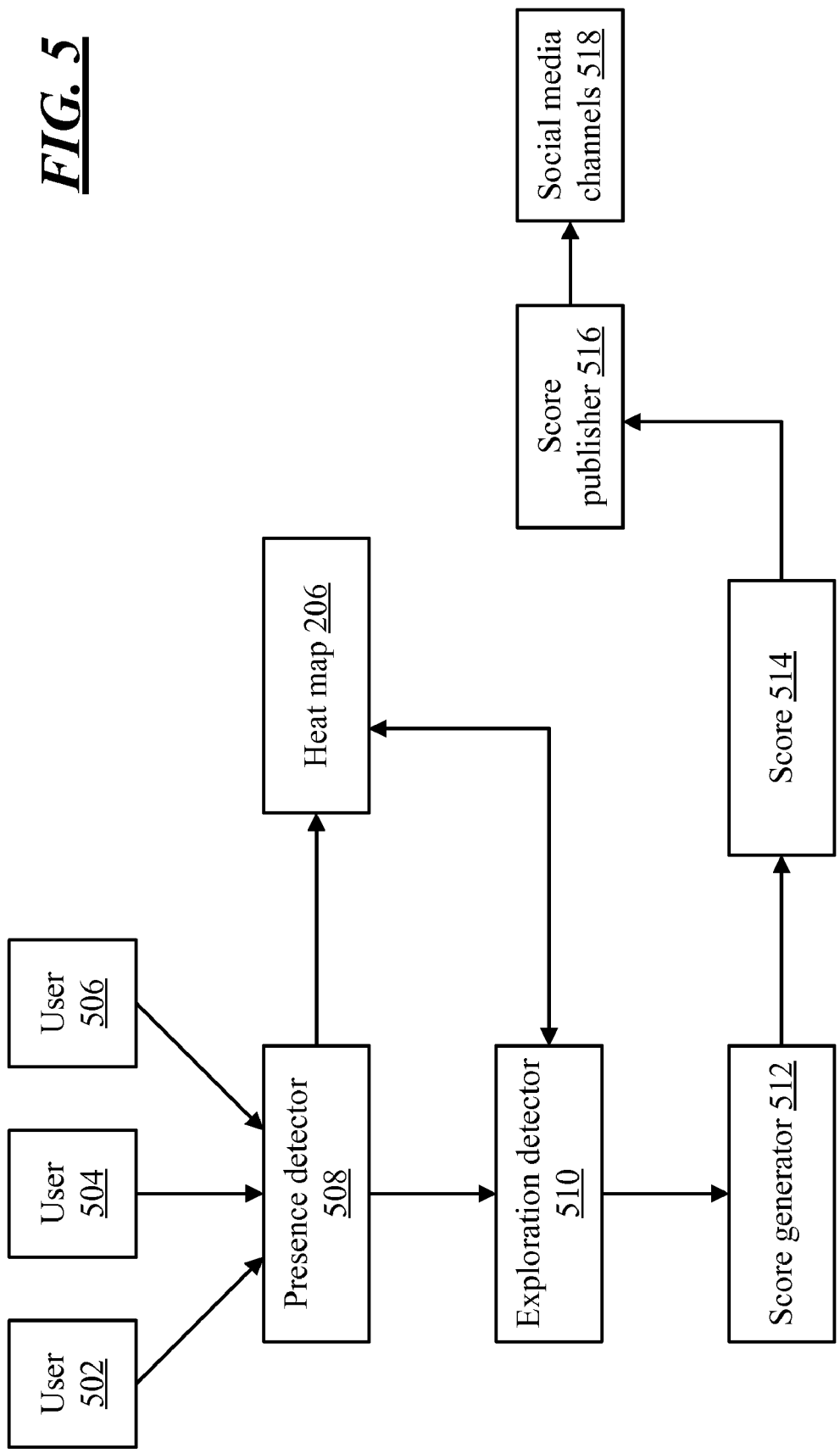
FIG. 5 is a block diagram of an example set of components that may be used to implement an exploration game.

FIG. 5 shows an example set of components that may be used to implement an exploration game. In the example of FIG. 5, users 502, 504, and 506 carry devices that are capable of determining and reporting their location. Although users 502-506 could have turned off the location features of their devices in the interest of privacy, they have opted to allow their location information to be reported in order to participate in an exploration game. Thus, devices carried by users 502-506 report their location to a presence detector 508. Presence detector may create a heat map 206 for each of the users, which indicates each user's areas of common presence.

An exploration detector 510 uses heat map 206, as well as information from presence detector 508 concerning the a user's current location, to determine whether the user has explored outside of his or her area of common presence. Exploration detector 510 may make this determination using, for example, portions of the process described above in connection with FIG. 2. If a user is determined to have explored outside of his or her area of common presence, a score generator 512 may generate a score 514 for that user's exploration. Score generator may arrive at the score using the example factors that are discussed above in connection with FIG. 4. Once the score has been generated, a score publisher 516 may publish the score. For example, score publisher 516 may post a user's score through various social media channels 518, such as the user's Facebook or Twitter account. The publishing of the score may take place automatically. For example, the user may have registered his or her Facebook or Twitter account with a system that implements the exploration game, so that the user's score, and information about the user's exploration events, may be published automatically when scores are increased and/or when exploration events occur.

It is noted that components such as presence detector 508, exploration detector 510, score generator 512, and score publisher 516 may be implemented as software, hardware, a combination thereof, or through any appropriate mechanism.

Figure 6:
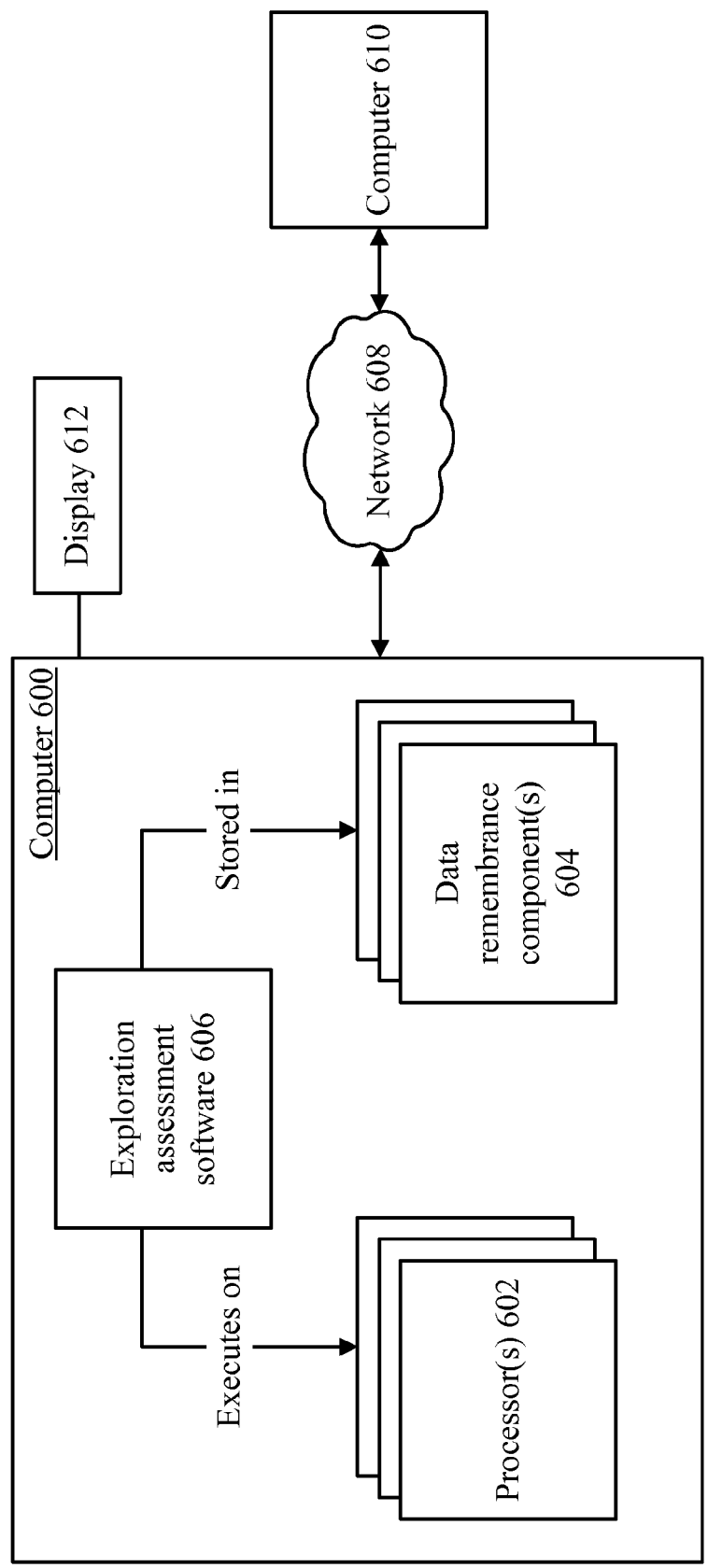
FIG. 6 is a block diagram of example components that may be used in connection with implementations of the subject matter described herein.

FIG. 6 shows an example environment in which aspects of the subject matter described herein may be deployed.

Computer 600 includes one or more processors 602 and one or more data remembrance components 604. Processor(s) 602 are typically microprocessors, such as those found in a personal desktop or laptop computer, a server, a handheld computer, or another kind of computing device. Data remembrance component(s) 604 are components that are capable of storing data for either the short or long term. Examples of data remembrance component(s) 604 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 600 may comprise, or be associated with, display 612, which may be a cathode ray tube (CRT) monitor, a liquid crystal display (LCD) monitor, or any other type of monitor.

Software may be stored in the data remembrance component(s) 604, and may execute on the one or more processor(s) 602. An example of such software is exploration assessment software 606, which may implement some or all of the functionality described above in connection with FIGS. 1-5, although any type of software could be used. Software 606 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 6, although the subject matter described herein is not limited to this example.

The subject matter described herein can be implemented as software that is stored in one or more of the data remembrance component(s) 604 and that executes on one or more of the processor(s) 602. As another example, the subject matter can be implemented as instructions that are stored on one or more computer-readable storage media or storage memories. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that transmit propagating signals. DVDs, flash memory, magnetic disks, etc., are examples of storage media. On the other hand, wires or fibers on which signals exist ephemerally are examples of transitory signal media.

Additionally, any acts described herein (whether or not shown in a diagram) may be performed by a processor (e.g., one or more of processors 602) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 600 may be communicatively connected to one or more other devices through network 608. Computer 610, which may be similar in structure to computer 600, is an example of a device that can be connected to computer 600, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media that store executable instructions to encourage exploration of a physical area, the executable instructions, when executed by a computer, causing the computer to perform acts comprising:
   maintaining an exploration score for a user;
   first determining where said user is located;
   second determining, based on a heat map of said user's historical movement, that said user is physically outside of said user's area of common presence;
   based on said user's being in a place that is outside of said user's area of common presence, increasing said user's exploration score; and
   publishing said user's exploration score,
said user having previously visited said place before said first determining, said acts further comprising:
   third determining an amount of time that has passed between said user's previously visiting said place and said first determining, said increasing of said user's score being based on said amount of time.

2. The one or more computer-readable storage media of claim 1, said increasing of said user's score being based on a non-likelihood of said user's being in said place.

3. The one or more computer-readable storage media of claim 1, said increasing of said user's score being based on a duration of time since said user has been outside of said area of common presence.

4. The one or more computer-readable storage media of claim 1, said acts further comprising:
   determining a distance between said place and said user's area of common presence, said increasing of said user's score being based on said distance.

5. The one or more computer-readable storage media of claim 1, said publishing comprising:
   posting said user's score, or an indication of where said user has traveled to, on a social medium.

6. The one or more computer-readable storage media of claim 1, said acts further comprising:
   displaying a score board showing exploration scores of a plurality of users, including said user.

7. A method of encouraging exploration of a physical area, the method comprising:
   using a processor to perform acts comprising:
      receiving a plurality of location data indicating a user's location at points in time;
      first determining, based on said plurality of location data, said user's area of common presence;
      second determining where said user is located at a point in time;
      third determining, based on said user's area of common presence, that said user is, at said point in time, physically in a place that is outside of said area of common presence;

based on said user's being in a place that is outside of said user's area of common presence, increasing an exploration score of said user; and publishing said user's exploration score, said user having previously visited said place before said second determining, said acts further comprising:

determining a amount of time that has passed between said user's previously visiting said place and said point in time, said increasing of said user's score being based on said amount of time.

8. The method of claim 7, said acts further comprising:
using a heat map of said user's historical locations to determine a likelihood of said user's being in said place, said increasing of said user's score being based on said likelihood.

9. The method of claim 7, said acts further comprising:
determining a distance between said area of common presence and said place, said increasing of said user's score being based on said distance.

10. The method of claim 7, said increasing of said user's score being based on an amount of time since said user has been outside of said user's area of common presence.

11. The method of claim 7, said publishing comprising:
posting said user's score, or an indication of where said user has traveled to, on a social medium.

12. The method of claim 7, said acts further comprising:
displaying a score board showing exploration scores of a plurality of users, including said user.

13. A system for encouraging exploration of a physical area, the system comprising:
a memory;
a processor;
a score generator that maintains an exploration score for a user;
an exploration detector that determines where said user is located and that determines, based on a heat map of said user's historical movement, that said user is physically outside of said user's area of common presence, said score generator increasing, based on said user's being in a place that is outside of said user's area of common presence, said user's exploration score; and
a score publisher that publishes said user's exploration score, said user having previously visited said place plural times, said score generator determining an amount of time that has passed between said user's visits to said place, said score generator increasing said user's score based on said amount of time.

14. The system of claim 13, said increasing of said user's score by said score generator being based on a non-likelihood of said user's being in said place.

15. The system of claim 13, said increasing of said user's score by said score generator being based on a duration of time since said user has been outside of said area of common presence.

16. The system of claim 13, said score generator determining a distance between said place and said user's area of common presence, said increasing of said user's score by said score generator being based on said distance.

17. The system of claim 13, further comprising:
a score publisher that posts said user's score, or an indication of where said user has traveled to, on a social medium.

* * * * *